US006264842B1

(12) United States Patent
Boehm

(10) Patent No.: US 6,264,842 B1
(45) Date of Patent: Jul. 24, 2001

(54) CONTINUOUS MAGNETIC SEPARATOR

(75) Inventor: Josef Boehm, Henley-on-Thames (DE)

(73) Assignee: Outokumpu Technology, Inc., Englewood, CO (US)

(*) Notice: Subject to any disclaimer, the term of this patent is extended or adjusted under 35 U.S.C. 154(b) by 0 days.

(21) Appl. No.: 09/327,638

(22) Filed: Jun. 8, 1999

(51) Int. Cl.[7] .............................. B01D 35/06; B03C 1/08

(52) U.S. Cl. .......................... 210/695; 210/222; 209/213; 209/214; 209/223.1; 209/223.2; 209/224; 96/1; 96/2; 96/3; 95/28

(58) Field of Search .................................... 210/222, 223, 210/695; 95/28; 96/1, 2, 3; 209/213, 214, 223.1, 223.2, 224

(56) References Cited

U.S. PATENT DOCUMENTS 4,306,970 * 12/1981 Tanaka et al. ...................... 210/222
4,828,711 * 5/1989 Cohen ................................ 210/695
4,902,428 * 2/1990 Cohen ................................ 210/695

FOREIGN PATENT DOCUMENTS

1338894 A1 * 9/1987 (SU) .

OTHER PUBLICATIONS

Derwent Translation of SU 1338894 A1, Sep. 1987.*

* cited by examiner

*Primary Examiner*—David A. Reifsnyder
(74) *Attorney, Agent, or Firm*—Arthur G. Yeager

(57) ABSTRACT

A method and apparatus for magnetically separating magnetizable particles from a mixture of magnetizable and nonmagnetizable particles of similar size and density by passing the particles through a magnetic field generated by a cylindrical coil around the outside of the column of the separator, and enhanced by a ferrous metal mass or ring within the column located generally centrally of the coil.

20 Claims, 2 Drawing Sheets

CONTINUOUS MAGNETIC SEPARATOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to the art of separation of one type of material from a mixture of two or more types of materials; and more specifically, it relates to the separation of such types as they pass through a magnetic field.

2. Description of Related Art

Russian Patent No. 1338-894-A discloses an electromagnet with ferromagnetic material inside the separator chamber. U.S. Pat. Nos. 4,828,711 and 4,902,428 to Cohen disclose magnets disposed within the flow path of the materials being separated. U.S. Pat. No. 4,306,970 to Tanaka discloses a separation device employing a solenoid using amorphous metal elements. This art teaches how to trap metals rather than how to separate one type from another.

BRIEF SUMMARY OF THE INVENTION

This invention relates to an apparatus for magnetically separating magnetizable particles from a mixture of particles, some of which are magnetizable while others are less magnetizable or nonmagnetizable. The mixture of particles to be separated are dropped vertically down a pathway generally perpendicular to a horizontally positioned steel rod that is in the middle of a magnetic field surrounding the pathway and the rod. The pathway is fashioned to circumvent the rod through 180 degrees and resume its downward direction below the rod. A splitter is positioned below the rod to separate magnetizable particles from nonmagnetizable particles. In another embodiment of the invention a mixture of particles is fed into a pathway to form a thin curtain of mixed magnetizable and nonmagnetizable particles passing through a magnetic field generated by an outer circumferential coil and enhanced by an inner circumferential core; the curtain of particles dropping between the coil and the core. A circumferential splitter is positioned immediately following the coil directing the magnetizable particles into an axially central conduit and the nonmagnetizable particles to an outer doughnut-shaped space around the central conduit.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DETAILED DESCRIPTION OF THE INVENTION

This invention relates to a device and a process for using the device to separate one type of particle from another. Generally, the particles are all of about the same size and density such that a mixture of the particles will not stratify to any significant extent. The separation is based on the fact that a ferromagnetic component (a pole piece) within a homogeneous magnetic field will enhance the magnetic field locally. The background field, created here by a solenoid coil, will increase when approaching the ferromagnetic component. It will reach its maximum in the center of this component and will fall again outside the component to the background field level. In the region where the field rises or falls a field gradient is created. This gradient, combined with the underlying magnetic field, creates a force that acts on a magnetizable particle. When a magnetizable particle passes through this region of field and field gradient, it will be attracted towards the ferromagnetic component.

Magnetizable particles will move across the flow of the mixture of particles to get closer to the pole piece. If the flow of particles is long enough and the time is long enough the magnetizable particles will move to the edge of the pathway closest to the pole piece while the other type of particle will either be less attracted or not attracted at all, and will follow its natural trajectory. In any event, the effect is to separate the magnetizable particles from the remaining particles. The remaining process is to permanently separate the magnetizable particles from the remainder. The usual way to accomplish this is to employ a knife blade or splitter to divert the desired particles from the remainder of the mass being subjected to the separation process. The entire separation process may be accomplished in stages or the quality of the separation may be improved by subjecting the original mass to the same procedure a plurality of times or by subjecting the first cut to a second or third purification step. In the former procedure the first throughput will produce MAG (particles diverted to the magnetized side of the splitter) and NONMAG (particles non diverted to the magnetized side of the splitter). NONMAG is then sent through the same process a second time and any particles diverted to the magnetized side of the splitter are added to MAG. This may be repeated as many times as desired to retrieve all of the magnetized particles from the treated mass. In contrast to this procedure of repeatedly treating the NONMAG cut one may treat MAG to a second and third treatment in the same magnetic separation so as to purify the original MAG to contain only magnetized particles and to return to NONMAG any nonmagnetizable particles that may have been inadvertently carried along to the splitter and recovered along with the magnetized particles. Either of these two procedures may be applied to purify or enlarge the original cut from this process.

Figure 1:
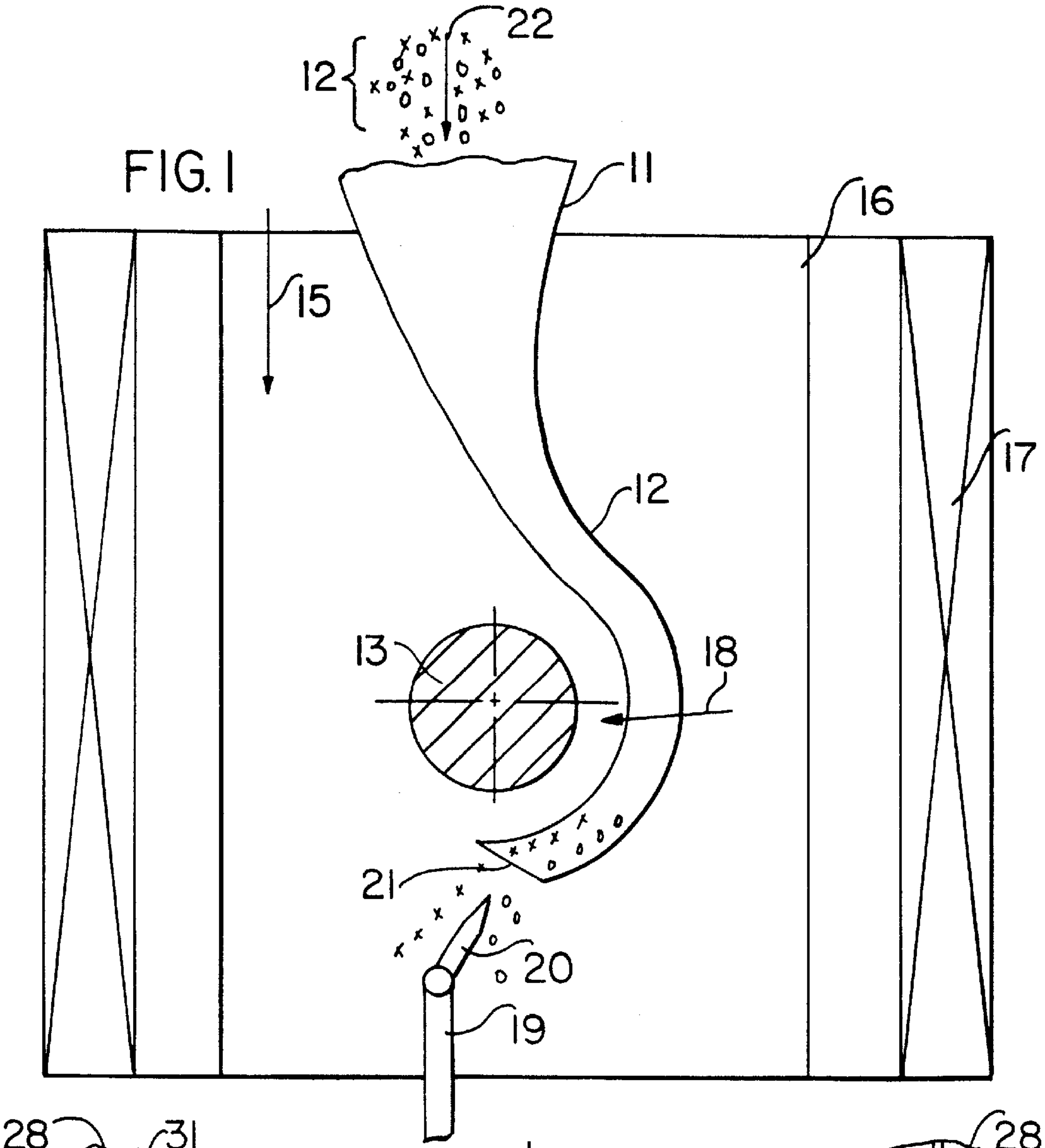
FIG. 1 is a vertical cross-section of a magnetic separator employing a single horizontal core rod and a vertical passageway curling partially around the core to lead the particles through the magnetic field for separation.

In accordance with the teachings of this invention the process may be carried out in an apparatus as shown in FIG. 1 of the attached drawings. A mixture of particles 12 of about the same size, comprising some magnetizable particles and some nonmagnetizable particles, is fed into the top of a chute 11 leading downwardly into a magnetic field of the separation machine of this invention. The direction of particle flow of the mass 12 is shown by arrow 22. A horizontally positioned steel bar 13 is situated in the center of a nonmagnetic housing 16 surrounded by a coil of magnet wire 17. Housing 16 may have any convenient shape, e.g., cylindrical, prismatic, or other convenient shapes. When the coil is activated a magnetic field is generated in the direction of arrow 15. This field rises near the top of rod 13, reaches its peak in the center of rod 13, and decays at the bottom of rod 13. It is in these regions of changing fields where an attractive magnetic force towards rod 13 occurs. The path for the particles to follow is curvaceous as seen at 14 as it bends circumferentially around rod 13 maintaining a space from the surface of rod 13 which is most effective in magnetizing whichever particles in the field. Magnetizable particles are shown in FIG. 1 by the letter "x"; and nonmagnetizable particles are identified by the letter "o". It may be seen that as the particles move farther and farther around rod 13 the magnetizable particles move closer and closer to the inside surface of path 12 which is closer and closer to the magnetism source, rod 13. The cross-sectional shape of rod 13 is not critical and may be round as shown in FIG. 1 or any other smoothly curved shape that is aerodynamically quiescent, e.g., oval, tear-drop or the like. At the end 21 of the path 12 the particles fall against the leading edge of splitter 20 which divides the magnetized particles "x" from the nonmagnetized particles "o", so as to collect each type separately. The splitter is shown with two parts, 19 and 20, the latter being hinged to the former so as to provide adjustability to produce a better division between magnetized particles and nonmagnetized particles.

Figure 3:
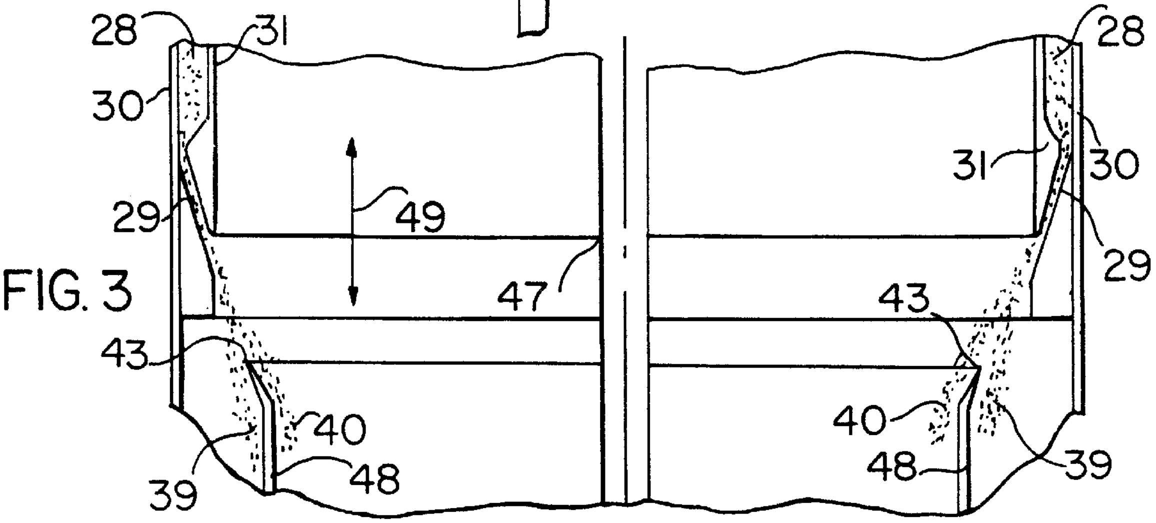
FIG. 3 is an enlarged portion of the cross-section of FIG. 2 at the outlet of the particle passageway and the inlet to the splitter without the ferrous mass ring.
Figure 2:
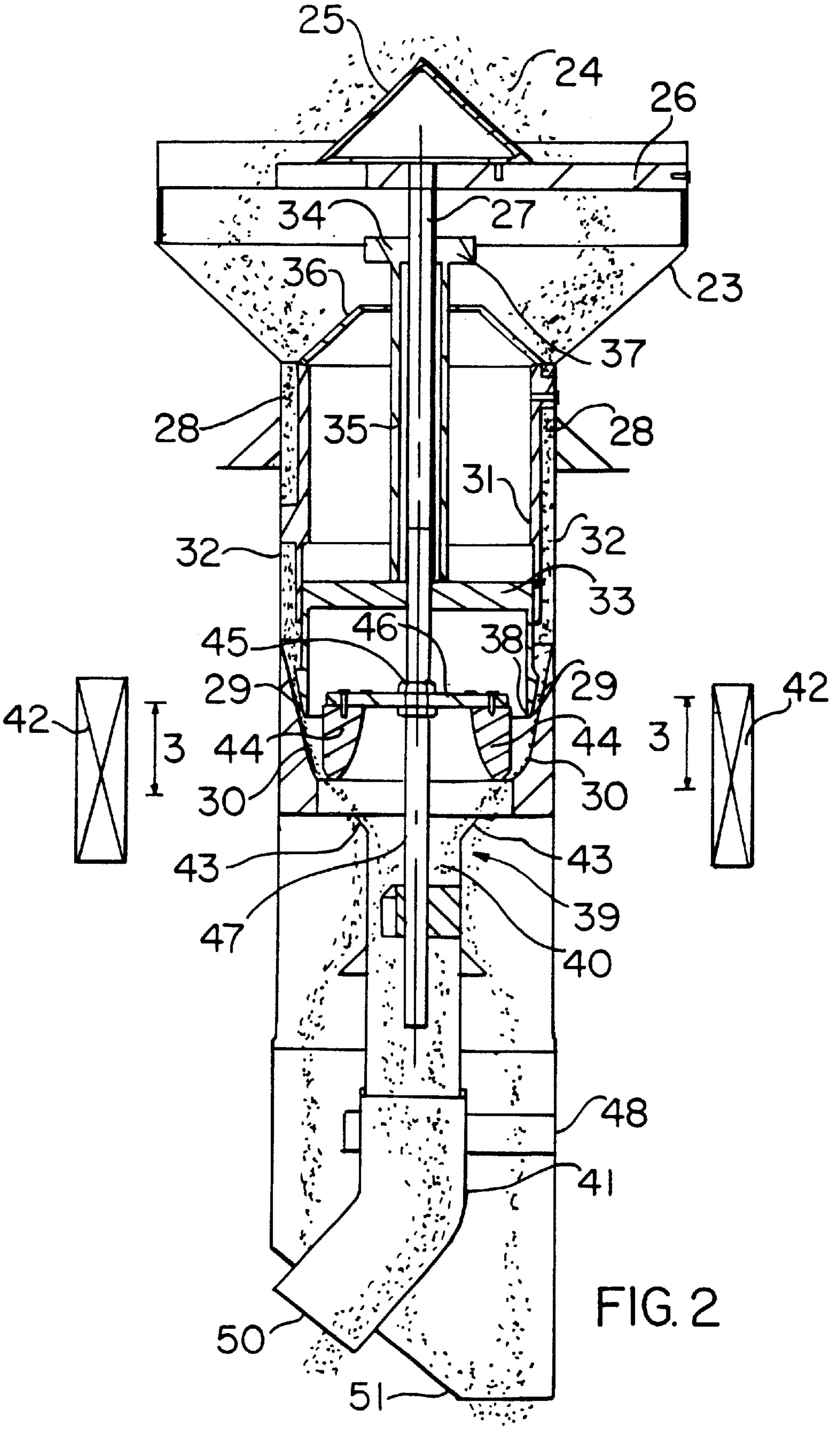
FIG. 2 is a vertical cross-section of a second embodiment of a magnetic separator employing a toroidal magnetic field generated by a cylindrical coil around the outside of the separator and enhanced by a cylindrical core inside the separator with a thin passageway for particles to fall between the core and the coil and be separated at a cylindrical splitter immediately below the magnetic force region at the tip of the core.

A second specie of the apparatus of this invention is shown in FIGS. 2 and 3, where the enhanced magnetic field is in the form of a ring and the particles to be treated are in the form of a cylindrical curtain falling vertically through the magnetizing ring. The magnetized particles are eventually separated from the nonmagnetized particles. A mixture of particles 24 to be separated in this process is fed into the apparatus over a distribution cone 25 and thence into a feed funnel 23 which distributes the particles exit through the lower end of channel 28 and are guided by wall 30 to fall against splitter 43 to divide magnetized particles 40 from nonmagnetized particles 39. A closed tubular channel 41 guides the magnetized particles downward to an exit at 50. Annular enclosure 48 guides nonmagnetized particles to an exit at 51. A short magnet coil 42 surrounds the apparatus adjacent to the lower section of channel 28 working in conjunction with mild separation of magnetizable particles from nonmagnetizable particles before the particle mass reaches splitter 43. Magnetized particles migrate toward the center of the apparatus while nonmagnetizable particles remain in the center of the channel or migrate toward the outside of the channel as they approach splitter 43.

There is a structure around the vertical axis of the apparatus which is employed to adjust the size of the opening of the outlet 29, at the exit of channel 28. Spindle tube 27 telescopes vertically inside tubular guide 47. Tube support 34 is connected to cross brace 33 and spaced upwardly therefrom by connector 35. Support 34 provides a housing for a set screw at 37 to form a firm attachment to spindle tube 27. Positioned downwardly from the outer extremity of cross brace 33 is skirt 38 which forms the inside surface of channel 28 guiding particles to exit 29 immediately before the particles meet splitter 43. Tip 29 is adjustable vertically by moving support arm 46 (which in turn supports ring 44) up and down tube 47 and tightening it in place with nut 45. Steel ring 44 can be removed from the separation zone for cleaning.

In general the parts of the apparatus of this invention are made of brass, plastic or other nonmagnetizable material. Of course, this does not apply to ring 44, which serves as a pole to the magnetic field produced by coil 42. This invention is admirably suited to a stage-wise operation of purification by allowing the magnetized product from outlet 50 to be a feed to a second apparatus similar to that of FIG. 1 so as to produce a product of relatively pure magnetizable particles. The apparatus of this application also lends itself well to a continuous operation as well as to a batch operation.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method for separating magnetizable particles from a mixture of magnetizable particles and nonmagnetizable particles comprising passing the mixture in a path around the outside of a centrally located mass of ferrous metal positioned with its major axis substantially level, the ferrous metal mass being magnetized by an electromagnetic circuit defined by a coil of electrically conducting wire surrounding the ferrous metal mass and spaced outwardly therefrom, the path being spaced outside of the surface of the ferrous metal mass and inside the coil of wire and being positioned to proceed from above the ferrous metal mass to below the ferrous metal mass where the particles are directed into a splitter having two sides, and recovering two portions of particles from respective two sides of the splitter.

2. The method of claim 1 wherein the mixture of particles is suspended in a continuous gaseous or liquid medium.

3. The method of claim 1 wherein said separation is accomplished in multiple stages, the first stage being that described in claim 1, a second stage comprising subjecting the nonmagnetizable particles recovered from the first stage to the second stage by passing the nonmagnetizable particles to a circuitous path around a second magnetized ferrous metal mass wherein the path and the ferrous metal mass are as those described in claim 1, and passing the particles leaving the second ferrous metal mass to a second splitter to produce two products, one of which is a second collection of magnetizable particles, and adding the second collection to the magnetizable particles recovered from those passing the splitter in the first stage.

4. A method of separating magnetizable particles from a mass of particles including said magnetizable particles, which method comprises directing the mass of particles in a thin cylindrical curtain falling by gravity through a circular magnetic field generated by an outer circular electrical coil and enhanced by a concentrically disposed inner circular ferrous metal ring, the thin cylindrical curtain of the mass of particles passing closely adjacent the ferrous metal ring and between the ferrous metal ring and the electrical coil, and thereafter passing the mass of particles through a splitter adjusted to separate the magnetized particles uplifted by the enhanced magnetic field produced by the ferrous metal ring from the nonmagnetized particles, and collecting the magnetized particles from the nonmagnetized particles in separate batches.

5. The method of claim 4 wherein the mass of particles is suspended in a fluid medium.

6. A method for separating magnetizable particles from a mixture of magnetizable particles and nonmagnetizable particles comprising the steps of:

A. passing the mixture through a substantially vertical hollow column of nonmagnetizable material disposed through a coil of an electromagnetic circuit;

B. positioning a ferrous metal mass in the space within the column defined by the coil;

C. directing the mixture from above the mass to a position laterally offset from the mass and generally at least to a horizontal plane at the bottom of the mass;

D. subjecting the mixture to the magnetic field created by the coil and enhanced by the mass to cause magnetizable particles to be directed upwardly against gravity while permitting nonmagnetizable particles to be directed downwardly by gravity; and E. splitting and recovering the magnetizable particles from the nonmagnetizable particles.

7. The method of claim 6 wherein the mass has a curved surface facing the mixture being directed in step C.

8. The method of claim 6 wherein the mass is an elongated rod extending generally horizontally.

9. The method of claim 6 wherein the mass is a ring.

10. The method of claim 6 wherein the mixture of particles is suspended in a continuous gaseous medium.

11. The method of claim 6 wherein the mixture of particles is suspended in a continuous liquid medium.

12. The method of claim 6 wherein the steps of claim 6 are repeated for the nonmagnetizable particles recovered in step E so that any entrained magnetizable particles which were with the nonmagnetizable recovered particles of claim 6 are separated and recovered and added to the magnetizable recovered particles of claim 6.

13. An apparatus for separating magnetizable particles from a particulate mass containing some magnetizable particles, comprising a substantially vertical hollow column having an entrance at the top thereof for receiving the particulate mass to be treated, passageway leading downwardly from said entrance of said column to an exit, said exit being directed inwardly to a circular splitter which directs an inner portion of the particles to a central hollow conduit and an outer portion to an annular space around said central tubular conduit and inside said cylindrical column, said apparatus including a central toroidal ferrous metal ring spaced inwardly from said passageway and upstream of said splitter, and an electrical magnetic coil spaced concentrically outwardly of said column in general alignment with said ferrous metal ring, said coil being activatable to create a magnetic field enhanced by said ring to forcibly deflect magnetizable particles into said hollow conduit and permit nonmagnetizable particles to fall into said annular space.

14. The apparatus of claim 13 wherein said passageway includes an inner wall which is vertically adjustable so as to produce, in conjunction with an immovable outer wall, a narrowing of said passageway as that passageway approaches its exit adjacent said metal ring.

15. The apparatus of claim 13 wherein said ring is removable to permit cleaning thereof.

16. The apparatus of claim 13 wherein said ring includes a curved surface facing said particles.

17. The apparatus of claim 13 wherein the column includes an inwardly curved surface carried by an outer wall of the column for directing the particles inwardly toward the ring while spacing the flow thereof so that magnetizable particles are deflected upwardly and inwardly without becoming attached to the ring due to gravity acting thereon.

18. An apparatus for separating magnetizable particles from a mixture of magnetizable particles and nonmagnetizable particles comprising a passageway for passing the mixture through a substantially vertical hollow column of nonmagnetizable material disposed through a coil of an electromagnetic circuit, a ferrous metal mass being disposed in a space within said column defined by said coil, said passageway directing the mixture from above said mass to a position laterally offset from said mass and generally at least to a horizontal plane at a bottom of said mass, the mixture being subjected to a magnetic field created by said coil and enhanced by said mass to cause magnetizable particles to be directed upwardly against gravity while permitting nonmagnetizable particles to be directed downwardly by gravity, and a splitter for separating the magnetizable particles from the nonmagnetizable particles.

19. The apparatus of claim 18 wherein the ferrous metal mass includes a curved surface facing the particles.

20. The apparatus of claim 18 wherein the ferrous metal mass is spaced from magnetizable particles which are deflected upwardly and inwardly without becoming attached to the ferrous metal mass due to gravity acting on such particles.

* * * * *